United States Patent

Manwaring

[11] 3,901,102
[45] Aug. 26, 1975

[54] AXLE RETAINING DIFFERENTIAL MECHANISM

[75] Inventor: Richard C. Manwaring, O_emos, Mich.

[73] Assignee: General Motors Corporation, Detroit, Mich.

[22] Filed: Oct. 5, 1973

[21] Appl. No.: 404,103

[52] U.S. Cl. ............... 74/710; 74/714; 403/359
[51] Int. Cl.² ... F16H 1/38; F16H 1/42; B25G 3/28; F16B 7/00
[58] Field of Search .......... 74/710, 710.5, 711, 713, 74/714; 403/359

[56] References Cited
UNITED STATES PATENTS

| | | | |
|---|---|---|---|
| 3,429,400 | 2/1969 | Engle et al. | 74/710.5 X |
| 3,551,013 | 12/1970 | Trojanowski et al. | 403/359 X |
| 3,675,497 | 7/1972 | Thomas | 403/359 X |
| 3,715,936 | 2/1973 | Jones | 74/710.5 X |

Primary Examiner—Samuel Scott
Assistant Examiner—Lance W. Chandler
Attorney, Agent, or Firm—Robert M. Sigler

[57] ABSTRACT

In a differential mechanism, the side gear openings and axle shafts are provided with axially inner and outer splined portions separated by separating portions. The inner and outer splined portions are normally engaged; but, should the axle shaft begin to pull out of the differential, the splined portions disengage and the axle shaft and side gear are free to rotate independently with the inner splined portion of the axle shaft within the separating portion of the side gear and prevented from further withdrawal by the outer splined portion of the side gear.

2 Claims, 3 Drawing Figures

PATENTED AUG 26 1975
3,901,102
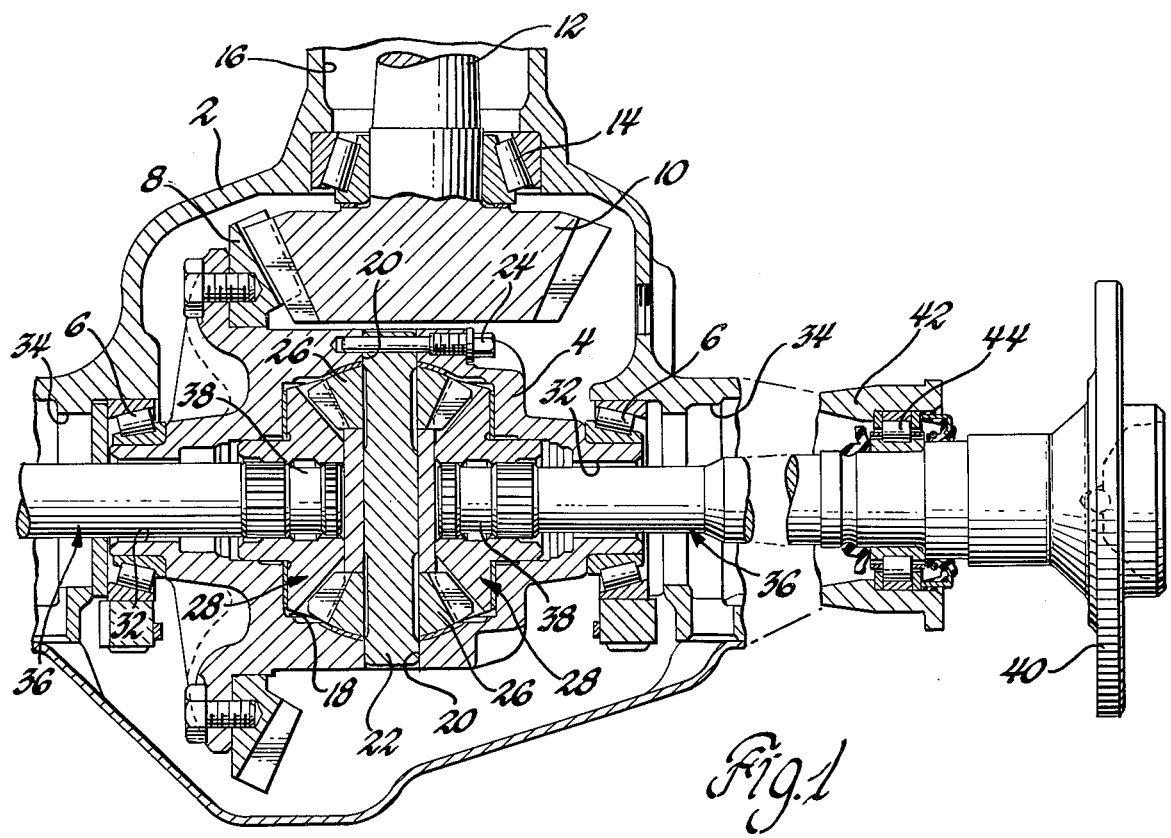
Fig.1
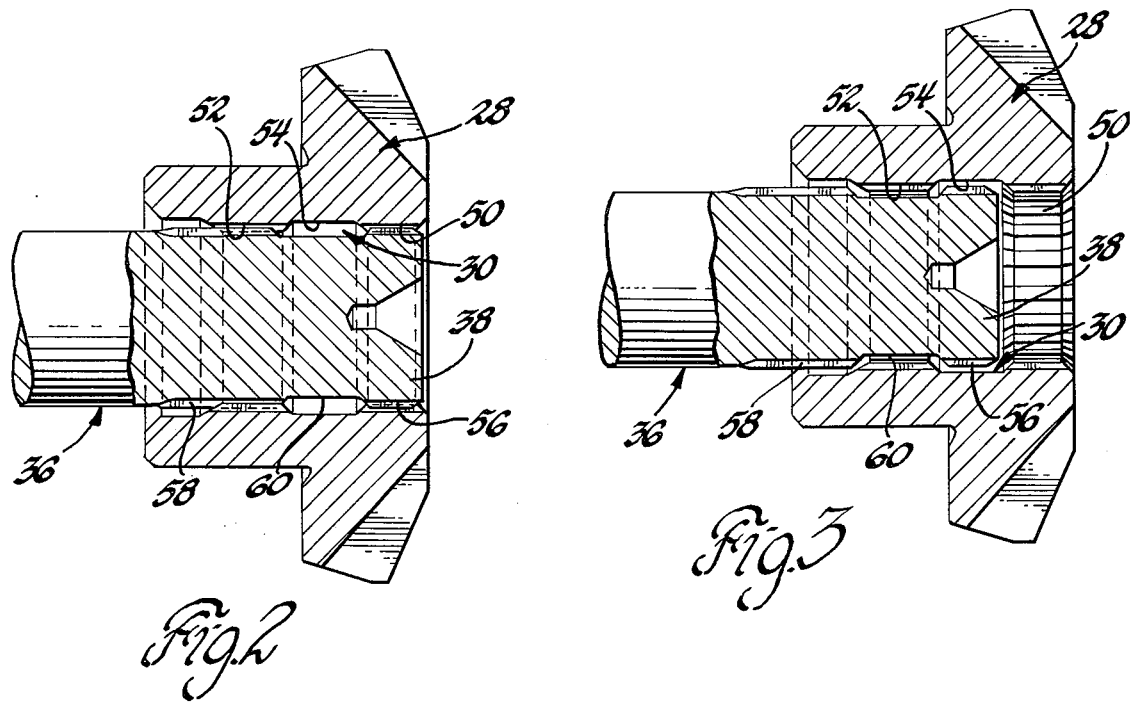
Fig.2
Fig.3

AXLE RETAINING DIFFERENTIAL MECHANISM

BACKGROUND OF THE INVENTION

A vehicle drive system generally includes a differential mechanism and a pair of axle shafts to provide power to the driving wheels. The normal arrangement is for the axle shafts to be supported in bearings near their outer ends with their inner ends splined within openings in the side gears of the differential mechanism. Normally, each axle shaft is restrained from axial movement by retaining means included with the bearing assembly. However, it is often desired to include redundant axle shaft retaining means within the differential mechanism to prevent the inner end of the axle shaft from being withdrawn therefrom. In the past, various types of washers and clips have been suggested for accomplishing this. For numerous reasons, however, few of these proposals have been entirely satisfactory.

SUMMARY OF THE INVENTION

My invention embodies a differential mechanism that provides for axle retention therein without the use of additional clips or washers. In my invention, the axle shaft and the opening of the side gear in which it is retained are provided with axially inner and outer splined portions with separating portions between them. Normally the axle shaft is received in the side gear opening with the inner splined portions of axle shaft and side gear engaged and the outer splined portions of axle shaft and side gear engaged. If, for some reason, the axle shaft begins to withdraw from the side gear, the splined portions disengage so that the axle shaft and side gear rotate freely with respect to one another with the inner splined portion of the axle shaft within the separating portion of the side gear and the outer splined portion of the side gear surrounding the separating portion of the axle shaft. Further withdrawal of the axle shaft from the side gear is prevented by the abutment of the inner splined portion of the axle shaft against the outer splined portion of the side gear.

Further details and advantages of my invention will be apparent in the following drawings and description of the preferred embodiment.

SUMMARY OF THE DRAWINGS

FIG. 1 is a cutaway view of the differential mechanism of my invention.

FIG. 2 is an enlarged cutaway view of a side gear and the inner end of an axle shaft engaged therein as used in the differential of FIG. 1.

FIG. 3 is an enlarged cutaway view of the side gear and inner end of the axle shaft as shown in FIG. 2, but with the axle shaft partially withdrawn and disengaged from the side gear.

DESCRIPTION OF A PREFERRED EMBODIMENT

Referring to FIG. 1, a vehicle drive mechanism includes a differential mechanism having an outer housing 2 with a casing 4 rotatably supported therein on bearings 6. A ring gear 8 drivingly attached to the casing 4 engages a drive gear 10 within the housing 2 which is fixed to one end of a drive shaft 12. The drive shaft 12, its one end being supported in bearings 14, projects through an opening 16 in the housing 2 towards the vehicle's source of driving power and provides power therefrom to rotatably drive the casing 4 through the drive gear 10 and ring gear 8.

The casing 4 defines a chamber 18 and has a pair of diametrically opposed openings 20 therein. A pinion shaft 22, retained by a pin 24 in said casing 4 with one end thereof in each opening 20, traverses the chamber 18. A pair of pinion gears 26 are rotatably supported on the pinion shaft 22, one near each end, within the chamber 18. A pair of side gears 28 retained within chamber 18 engages the pinion gears 26 to form a standard differential gear mechanism. The side gears 28 are axially aligned with the casing 4 and are constrained by the differential gear mechanism to either rotate together with the casing 4 or rotate in opposite directions with respect to each other within the casing 4 in the normal manner.

Each side gear 28 has a central axial opening 30 therethrough aligned with further openings 32 in the casing 4 and openings 34 in the housing 2. An axle shaft 36 with an inner end 38 received within the opening 30 projects outward from each side gear 28 through the openings 32 and 34. The outer end of the axle shaft 36 forms a hub 40 for the attachment of a wheel, not shown. Near the hub 40, the axle shaft 36 is supported in a vehicle supported axle tube 42 by a bearing assembly 44, which normally prevents outward axial movement of the axle shaft 36 in a standard manner well known to those skilled in the art.

Referring to FIG. 2, the central axial opening 30 of the side gear 28 defines a surface having an axially inner splined portion 50, an axially outer splined portion 52 and a smooth separating portion 54 therebetween. The inner and outer splined portions 50 and 52 preferably have identical inner and outer diameters, the inner diameter being defined as the distance from the top surface of one splined tooth to the top surface of a diametrically opposed splined tooth and the outer diameter being defined as the distance from the bottom of one spline valley to the bottom of a diametrically opposed spline valley. The difference between the inner and outer diameters is thus seen to be twice the height of the spline teeth. The diameter of the surface of the separating portion 54 is preferably slightly larger than the outer diameter of the splined portions 50 and 52.

The inner end 38 of the axle shaft 36 is also provided with an axially inner splined portion 56, an axially outer splined portion 58 and a smooth separating portion 60 therebetween. In the case of the axle shaft, the inner diameter is the distance between diametricaly opposed spline valleys and the outer diameter is the distance between the radially outer surfaces of diametrically opposed spline teeth. The inner and outer diameters of the splined portions 56 and 58 are again made equal, with the diameter of the annular surface of the smooth separating portion 60 being somewhat less than the inner diameter of the splined portions 56 and 58.

On the side gear 28, the splined portions 50 and 52 are of essentially the same cross section with the spline teeth of the inner spline portion 50 aligned, tooth for tooth, with the spline teeth of the outer splined portion 52; and the same is true for the splined portions 56 and 58 of the axle shaft 36. Thus, during assembly of the differential drive mechanism, the inner end 38 of the axle shaft 36 can be inserted into the opening 30 of the side gear 28 by sliding the inner splined portion 56 of the axle shaft 36 through the outer splined portion 52, past the separating portion 54 and into engagement with the inner splined portion 50 of the side gear 28. When the inner splined portions 50 and 56 are brought into engagement, the outer splined portions 52 and 58 are so spaced and aligned that they are also brought into engagement. Thus the normal condition of the side gear 28 and axle shaft 36 is as shown in FIG. 2, with inner splined portions 50 and 56 in engagement, outer splined portions 52 and 58 in engagement and separating portions 54 and 60 adjacent each other. In this condition, the axle shaft 36 and side gear 28 are engaged to rotate together.

If, for some reason, the bearing assembly 44 should fail to retain the axle in its normal position, a lateral outward force on the axle shaft 36 might pull it outward into the position shown in FIG. 3. The relative magnitudes of certain dimensions in the axle shaft 36 and side gear 28 determine the subsequent operation of the differential mechanism. The inner splined portion 56 of the axle shaft 36 has a smaller outer diameter and a smaller axial width than the diameter and axial width, respectively, of the separating portion 54 of the side gear 28. The outer splined portion 52 of the side gear 28 has a larger inner diameter and a smaller axial width than the diameter and axial width, respectively, of the separating portion 60 of the axle shaft 36. Thus, the axle shaft 36 can be pulled axially into a position where the inner splined portions 50 and 56 and the splined portions 52 and 58 are simultaneously disengaged and the axle shaft 36 and side gear 28 are free to rotate independently with the splined portion 56 adjacent the separating portion 54 and the splined portion 52 adjacent the separating portion 60.

In order for the axle shaft 36 to be pulled completely out of the side gear 28, the inner splined portion 56 of the axle shaft 36 would have to be pulled through the outer splined portion 52 of the side gear 28 in engagement therewith. This will not happen for two reasons. First, since the axle shaft 36 and side gear 28 are now rotating relative to one another and the fit of the spline teeth is very close, the edges of the splined portions 56 and 52 will intefere and prevent those splined portions from being pulled into engagement. Secondly, since the splined portions are no longer in engagement, the forces on the axle shaft 36 due to the weight of the vehicle exerted through the bearing assembly 44 and the reaction of the ground exerted through the hub 40 will not be balanced on the inner end 38 of the side gear 36; the shaft 36 will move slightly out of axial alignment with the side gear 28. This lack of axial alignment will make it even more difficult to bring the teeth of splined portion 56 into engagement with the teeth of splined portion 52. The result will be that the inner end 38 of the axle shaft 36 will be retained within the side gear 28 in approximately the position shown in FIG. 3; and the vehicle, being unable to transmit torque to its wheels because of the side gear 28 spinning freely with respect to the axle 36, can be coasted or braked to a safe stop, after which repairs can be made.

The preferred embodiment of my invention as shown and described above is not the only embodiment that will occur to those skilled in the art; and my invention should therefore be defined and limited only by the following claims.

I claim:

1. In a differential driving mechanism including a casing adapted to be rotatably driven and a differential gear assembly within said casing, the improvement comprising:

a pair of side gears included in said differential gear assembly, said side gears being adapted to be rotatably driven with said casing through said differential gear assembly but further being rotatable in opposite directions with respect to each other within said casing, each of said gears having an axial opening therethrough, each of said openings having two axially spaced sets of internal splines; a pair of rotatable output members having inner ends received in said openings and adapted to be normally rotatably driven by said side gears, said inner end of each said output member having two axially spaced sets of external splines thereon, the spline sets being of essentially the same cross section, each set of external splines normally mating with the corresponding set of internal splines, the spline sets being spaced apart axially a sufficient distance that the splines may be disengaged by relative axial displacement of a side gear and output member such as to dispose a spline set of said output member axially between the spline sets of said side gear, whereupon relative rotation of the members will inhibit further relative axially displacement of said output member and side gear.

2. In a differential driving mechanism including a casing adapted to be rotatably driven and a differential gear assembly within said casing, the improvement comprising:

a pair of side gears included in said differential gear assembly, said side gears being adapted to be rotatably driven with said casing through said differential gear assembly but further being rotatable in opposite directions with respect to each other within said casing, each of said gears having an axial opening therethrough, each of said openings having an axially inner splined portion, an axially outer splined portion and a separating portion therebetween;

a pair of rotatable output members having inner ends received in said openings and adapted to normally be rotatably driven by said side gears, said inner end of each said output member having an axially inner splined portion adapted for engagement with said side gear axially inner splined portion, an axially outer splined portion adapted for engagement with said side gear axially outer splined portion and a separating portion therebetween, said output member separating portion having diameter smaller and axial width greater than the inner diameter and axial width, respectively, of said side gear outer axial splined portion, said side gear separating portion having diameter and axial width greater than the outer diameter and axial width, respectively, of said output member inner axial splined portion, said output member inner axial splined portion having an outer diameter greater than the inner diameter of said side gear outer axial splined portion, whereby, should either of said output members be withdrawn from engagement with its corresponding side gear while being driven thereby, said output member and side gear will rotate freely with respect to each other with said output member inner axial splined portion contained within said output member separating portion and being prevented from further withdrawal by said side gear outer axial splined portion.

* * * * *